United States Patent
Ryu et al.

(10) Patent No.: US 7,885,224 B2
(45) Date of Patent: Feb. 8, 2011

(54) METHOD FOR REESTABLISHMENT OF IP ADDRESS FOR IDLE MODE MSS AND METHOD FOR TRANSMITTING INFORMATION THEREOF IN BROADBAND WIRELESS ACCESS SYSTEM

(75) Inventors: Ki Seon Ryu, Seoul (KR); Yong Ho Kim, Gyeonggi-do (KR)

(73) Assignee: LG Electronics, Inc., Seoul (KR)

( * ) Notice: Subject to any disclaimer, the term of this patent is extended or adjusted under 35 U.S.C. 154(b) by 652 days.

(21) Appl. No.: 11/718,709

(22) PCT Filed: Nov. 4, 2005

(86) PCT No.: PCT/KR2005/003720

§ 371 (c)(1),
(2), (4) Date: Jan. 7, 2008

(87) PCT Pub. No.: WO2006/049457

PCT Pub. Date: May 11, 2006

(65) Prior Publication Data

US 2008/0095088 A1    Apr. 24, 2008

(30) Foreign Application Priority Data

Nov. 4, 2004    (KR) .................. 10-2004-0089292

(51) Int. Cl.
*H04Q 7/00* (2006.01)
(52) U.S. Cl. ..................................... 370/328
(58) Field of Classification Search ............... 370/310, 370/328, 331, 338, 351, 389; 455/403, 436–458
See application file for complete search history.

(56) References Cited

U.S. PATENT DOCUMENTS

| 7,130,614 B2 * | 10/2006 | Sreemanthula et al. ....... 455/411 |
| 7,269,425 B2 * | 9/2007 | Valko et al. .............. 455/456.1 |
| 7,366,524 B2 * | 4/2008 | Watanabe et al. ........... 455/458 |
| 7,623,876 B2 * | 11/2009 | Sarikaya et al. ............ 455/458 |
| 7,672,288 B1 * | 3/2010 | Iartym ........................ 370/349 |
| 2001/0027107 A1 * | 10/2001 | Shinozaki et al. ........... 455/456 |

(Continued)

FOREIGN PATENT DOCUMENTS

KR    2004-0012300 A    2/2004

OTHER PUBLICATIONS

Sun-Jong Kwon et al.: "Analysis of a Mobility Management Scheme Considering Battery Power Conservation in IP-Based Mobile Networks" IEEE Transactions on Vehicular Technology, vol. 53, No. 6, Nov. 2004, pp. 1882-1890.

*Primary Examiner*—Dmitry H Levitan
(74) *Attorney, Agent, or Firm*—Lee, Hong, Degerman, Kang & Waimey

(57) ABSTRACT

A method of updating an IP address of an idle mode mobile subscriber station in an IP based broadband wireless access system and method of transmitting information for updating the IP address are disclosed. In updating an IP address of a mobile subscriber moving away into a second base station area from a first base station area in a broadband wireless access system, the present invention includes the steps of in the first base station area, entering an idle mode, in the second base station area, receiving information about an IP address update in the idle mode, and according to the received information, changing or retaining an IP address.

11 Claims, 2 Drawing Sheets

U.S. PATENT DOCUMENTS

2003/0225887 A1* 12/2003 Purnadi et al. .............. 709/227
2004/0043774 A1   3/2004 Lee
2004/0179492 A1   9/2004 Zhang et al.

* cited by examiner

METHOD FOR REESTABLISHMENT OF IP ADDRESS FOR IDLE MODE MSS AND METHOD FOR TRANSMITTING INFORMATION THEREOF IN BROADBAND WIRELESS ACCESS SYSTEM

CROSS-REFERENCE TO RELATED APPLICATIONS

Pursuant to 35 U.S.C. §119, this application claims the benefit of earlier filing date and right of priority to International Application No. PCT/KR2005/003720, filed on Nov. 4, 2005, and to Korean Application No. 10-2004-0089292, filed on Nov. 4, 2004, the contents of all of which are hereby incorporated by reference herein in their entireties.

TECHNICAL FIELD

The present invention relates to communication system, and more particularly, to a method of updating an IP address of an idle mode mobile subscriber station in an IP based broadband wireless access system and method of transmitting information for updating the IP address.

BACKGROUND ART

Generally, a broadband wireless access system supports an idle mode and a sleep mode to minimize power consumption of a mobile subscriber station (MSS). The mobile subscriber station includes a mobile subscriber station applicable to a communication system enabling handover or a mobile subscriber station enabling wireless communications within an area covered by an access point.

During an idle mode, a mobile subscriber station needs not to perform a handover procedure in moving between base stations (BS) included in a same paging zone. The mobile subscriber station needs not to perform uplink information transmission for the handoff procedure, thereby saving the corresponding power consumption.

Actions of the idle mode can be summarized as follows. A paging zone is defined as an entire area taken charge of by a plurality of base stations called a paging group. Base stations included in the same paging zone have the same paging cycle (Paging_Cycle) and paging offset (Paging_Offset).

A mobile subscriber station can make a request for entering an idle mode to a base station. The base station delivers its paging zone ID (Paging-group ID) and the corresponding paging cycle and offset, whereby the mobile subscriber station can enter the idle mode. In entering the idle mode, the mobile subscriber station delivers a list the base station intends to retain in a format of flag. The base station delivers the information to retain in a format of flag in delivering the paging cycle and the paging offset. The retained information can be retained/managed by the base station having allowed the idle mode or by a paging controller as another object.

During the idle mode, the mobile subscriber station can decide whether to retain or end the idle mode through a paging delivered in a broadcast form from the base station each negotiated paging cycle. The mobile subscriber station performs a location update. The location update is performed if the paging group is changed or if an idle mode timer expires.

If a traffic to be transmitted by the mobile subscriber station in idle mode is generated, the mobile subscriber station can end the idle mode at any time. Meanwhile, if a traffic to be delivered to the mobile subscriber station in idle mode is generated, the base station enables the mobile subscriber station to end the idle mode via paging. If the mobile subscriber station is unable to receive the paging at a determined time since the mobile subscriber station in idle mode moves away into another paging zone or loses its synchronization or the like, the mobile subscriber station ends the idle mode.

Namely, as long as there is no information to transmit or receive, the mobile subscriber station having entered the idle mode can secure its free mobility within the same paging zone by receiving the paging periodically without performing a handoff procedure.

A mobile subscriber station enters an idle mode in a following manner. To enter an idle mode, a mobile subscriber station forwards an idle mode request message to a serving base station. The serving base station delivers a paging group ID, a paging cycle and a paging offset value to the mobile subscriber station via an idle mode response message and releases connection information with the mobile subscriber station and a radio resource allocated to the mobile subscriber station and the like.

Table 1 is an example of an idle mode requesting message from a mobile subscriber station to a base station using a conventional deregistration request message.

TABLE 1

| Syntax | Size | Notes |
|---|---|---|
| DREG-REQ message_format( ) { | | |
| Management Message Type = 49 | 8 bits | |
| De-registration_Request_Code | 8 bits | 0x00: MSS de-registration request from BS and network 0x01: Request for MSS de-registration from Serving BS and initiation of MSS idle mode 0x02-0x020xFF: reserved |
| TLV encoded parameters } | Variable | |

If a De-registration_Request_Code of the deregistration request message (DREG-REQ) is set to 0x01 (idle mode initiation request), information, as shown in Table 2, is included in the deregistration request (DREG-REQ) message to be transmitted to a mobile subscriber station. Table 2 shows an example of TLV encoding of a deregistration request (DREG-REQ) message.

TABLE 2

| Name | Type | Length | Value |
|---|---|---|---|
| Paging Cycle Request | ? | 2 | Request cycle in which the paging message is transmitted within the paging group. |
| Idle Mode Retain information | m | 1 | MSS request for Paging Controller retention of network re-entry MAC management message MXX service and operational information to expedite future Network Re-entry from Idle Mode. For each Bit location, a value of '0' indicates the information associated with the specified MAC management message is no requested to be retained and managed, a value of '1' indicates the information is requested to be retained and managed. |

TABLE 2-continued

| Name | Type | Length | Value |
|------|------|--------|-------|
| | | | Bit #0: Retain MSS service and operational information associated with SBC_REQ/RSP MAC management messages |
| | | | Bit #1: Retain MSS service and operational information associated with PKM-REQ/RSP MAC management messages |
| | | | Bit #2: Retain MSS service and operational information associated with REG-REQ/RSP MAC management messages |
| | | | Bit #3: Retain MSS service and operational information associated with Network |
| | | | Bit #4: Retain MSS and operational information associated with Time of Day Acquisition |
| | | | Bit #5: Retain MSS service and operation information associated with TFTP MAC management messages |
| | | | Bit #6: Retain MSS service and operational information associated with Full service (MAC state machines, CS classifier information, etc.) |

Table 3 shows an example of an idle mode response message forwarded from a base station to a mobile subscriber station using a conventional deregistration command (DREG-CMD) message.

TABLE 3

| Syntax | Size | Notes |
|--------|------|-------|
| DREG-CMD_Message_Format( ) { | | |
| Management Message Type = 29 | 8 bits | |
| Action code | 8 bits | |
| TLV encoded parameters | Variable | |
| } | | |

Table 4 shows examples of action codes of a conventional de-registration command (DREG-CMD) message.

TABLE 4

| Action Code | Action |
|-------------|--------|
| 0x00 | MSS shall leave the current channel and attempt to access another channel |
| 0x01 | MSS shall listen to the current channel but shall not transmit until an RES_CMD message of DREG_CMD with Action Code 0x00 is received. |
| 0x02 | MSS shall listen to the current channel but only transmit on the Basic, Primary Management, and Secondary Management Connections. |
| 0x03 | MSS shall return to normal operations and may transmit on any of its active connections. |
| 0x04 | MSS shall terminate current Normal Operations with the BS: the BS shall transmit this action code only in response to any SS DREG_REQ. |
| 0x05 | Require MSS de-registration from Serving BS and request initiation of MSS idle mode. |

TABLE 4-continued

| Action Code | Action |
|-------------|--------|
| 0x06 | The MSS may retransmit the DREG_REQ message after the time duration (REQ-duration) given by. |
| 0x07 | The MSS shall not retransmit the DREG_REQ message and shall wait for the DREG-CMD message. |
| 0x08-0xFF | Reserved |

If an action code of deregistration command (DREG-CND) is set to 0x05 (idle mode permission), the following information is included in a deregistration command (DREG-CMD) message to be forwarded to a mobile subscriber station.

Table 5 shows an example of TLV encoding of deregistration command (DREG-CMD).

TABLE 5

| Name | Type | Length | Value |
|------|------|--------|-------|
| Paging information | ? | 4 | Bits 15:0 - PAGING_CYCLE - Cycle in which the paging message is transmitted within the paging group. Bits 23:16 - PAGING OFFSET - Determines the frame within the cycle in which the paging message is transmitted. Must be smaller than PAGING CYCLE value. Bits 31:24 - Paging group the MSS is assigned to. |
| REQ-duration | ? | 1 | Waiting value for the DREG-REQ message re-transmission (measure in frames) |
| Paging Controller ID | oo | 6 | This is a logical network identifier for the serving BS of other network entity retaining MSS service and operational information and/or administering paging activity for the MSS while in IDLE mode. |
| Idle Mode Retain information | pp | 1 | Idle Mode Retain information is provided as part of this message is indicative only. Network Re-entry from idle mode process requirements may change at time of actual re-entry. For each bit location, a value of '0' indicates the information for the associated re-entry management messages shall not be retained and managed, a value of '1' indicates the information for the associated re-entry management message shall be retained and managed. Bit #0: retain MSS service and operational information associated with SBC_REQ/RSP MAC management messages Bit #1: Retain MSS service and operational information associated with PKM-REQ/RSP MAC management messages Bit #3: Retain MSS service and operational information associated with Network Bit #4: Retain MSS and operational information associated with Time of Day Bit #5: Retain MSS service and operation information associated with TFTP MAC management messages |

TABLE 5-continued

| Name | Type | Length | Value |
|------|------|--------|-------|
| | | | Bit #6: Retain MSS service and operational information associated with Full service (MAC state machines, CS classifier information, etc.) |

A base station notifies a medium access control (hereinafter abbreviated 'MAC') of a mobile subscriber station entering an idle mode to other base stations of a paging group to which the corresponding base station belongs to enable the corresponding mobile subscriber station to be paged by a same paging cycle (PAGING_CYCLE, PAGING OFFSET).

The mobile subscriber station having been permitted to enter the idle mode via the idle mode response message decides whether there is a downlink traffic delivered to itself via a broadcast-formatted paging message delivered from the base station, whether to perform a ranging or whether to keep retaining the idle mode, according to the paging cycle.

Table 6 shows an example of a paging announce (Paging-announce) message, which is forwarded to a paging controller or all base stations within a same paging zone by a base station having approved an idle mode entry of a mobile subscriber station.

TABLE 6

| Field | Size | Notes |
|-------|------|-------|
| Message Type | 8 bits | |
| Sender BS-ID | 48 bits | Base station unique identifier (Same number as that broadcasted on the DL-MAP message) |
| Recipient BS-ID | 48 bits | Set to 0xffffff to indicate broadcast |
| Time Stamp | 32 bits | Number of milliseconds since midnight GMT (set to 0xffffffff to ignore) |
| Num MSS | 8 bits | Number of MSSs to page |
| For(j=0; j<Num MSS; j++) { | | |
| MSS MAC address | 48 bits | |
| Paging Group ID | 8 bits | The identifier of the paging group to which the MSS belongs |
| PAGING CYCLE | 16 bits | MSS PAGING CYCLE parameter |
| PAGING OFFSET | 8 bits | MSS PAGING OFFSET parameter |
| Action Code | 3 bits | 0: MSS enters Idle Mode<br>1: MSS exists Idle Mode<br>2: MSS should be paged to perform ranging to establish location and acknowledgement message<br>3: MSS should be paged to enter a network |
| reserved | 5 bits | |
| } | | |
| Security field | TBD | A means to authenticate this message |
| CRC field | 32 bits | IEEE CRC-32 |

Optionally, in forwarding the message, the base station having approved the idle mode forwards the paging announce message to the paging controller. The paging controller generates a differently-formatted message based on the contents and then forwards it to all base stations within the same paging zone.

Table 7 shows an example of a paging message periodically received by a mobile subscriber station from base stations of a paging group.

TABLE 7

| Syntax | Size | Notes |
|--------|------|-------|
| MOB_PAG-ADV_Message_Format( ) { | | |
| Management Message Type=?? | 8 bits | |
| Num_Paging_Group_IDs | 8 bits | Number of Paging Group IDs in this message |
| For(i=0; i<Num_Paging_Group_IDs; I++ { | | |
| Paging Group ID | 8 bits | |
| } | | |
| For(j=0; j<Num _MACs; j++) { | | Number of MSS MAC Addresses in message can be determined from the length of the message (found in the generic MAC header). |
| MSS MAC Address hash | 24 bits | The hash is obtained by computing a CRC24 on the MSS 48-bit MAC address. The polynomial for the calculation is 0x864CFB. |
| Action Code | 2 bits | Paging action instruction to MSS:<br>00 = No Action Required;<br>01 = Perform Ranging to establish location and acknowledge message;<br>10 = Enter Network; and<br>11 = Reserved |
| Reserved } | 6 bits | |
| } | | |

Once the mobile subscriber station receives the paging message indicating that there is a downlink traffic, the mobile subscriber station terminates the idle mode and re-registers to a network to receive a downlink data traffic. In case of performing re-registration to the network after terminating the idle mode, the mobile subscriber station re-registers to the network using ranging.

Table 8 shows an example of a ranging request (RNG-REQ) message.

TABLE 8

| Syntax | Size | Notes |
|--------|------|-------|
| RNG_REQ_Message_Format( ) { | | |
| Management Message Type = 4 | 8 bits | |
| Downlink Channel ID | 8 bits | |
| TLV Encoded Information | variable | TLV specific |
| } | | |

Table 9 shows information added to a ranging request when a mobile subscriber station conducts a location update or re-registers to a network after terminating an idle mode. A base station having received this information recognizes that the mobile subscriber station performs ranging to make the location update in idle mode or the re-registration to the network.

TABLE 9

| Serving BS ID | 4 | 6 | The unique identifier of the former Serving BS |
|---|---|---|---|
| HO Indication | | 1 | Presence of item in message indicates the MSS is currently attempting HO to the BS regardless of value |
| HO ID | 5 | 1 | The identification assigned to a MSS during HO by a target BS |
| Location Update request | | 1 | Presence of item in message indicates MSS action of Idle Mode Location Update Process, regardless of value |
| Paging Controller ID | | 6 | This is a logical network identifier for the serving BS or other network entity retaining MSS service and operational information and/or administrating paging activity for the MSS while in Idle Mode |

In re-registering to the network quickly from the idle mode using ranging, the base station or paging controller firstly approved the idle mode informs the mobile subscriber station of the currently retained information to instruct a procedure that can be skipped by the mobile subscriber station. The mobile subscriber station performs quick network re-registration by performing a necessary procedure only using the information. If the mobile subscriber station is requested to perform ranging by the paging message, the mobile subscriber station performs the ranging so that the base station can update a location of the mobile subscriber station and a valid idle mode mobile subscriber station list.

Table 10 shows an example of a ranging response message transmitted in response to the ranging response message.

TABLE 10

| Syntax | Size | Notes |
|---|---|---|
| RNG_RSP_Message_Format( ) { | | |
| Management Message Type = 5 | 8 bits | |
| Downlink Channel ID | 8 bits | |
| | variable | TLV specific |
| } | | |

Table 11 shows a ranging response (RNG-RSP) TLV message.

TABLE 11

| HO Process Optimization | 1 | For each Bit location, a value of '0' indicates the associated re-entry management message shall be required, a value of '1' indicates the re-entry management message may be omitted. Regardless of the HO Process Optimization TLV settings, the Target BS may send unsolicited SBC-RSP and/or REG-RSP management messages. Bit #0: Omit PKM-REQ RSP management messages during current reentry processing Bit #1: Omit PKM-REQ RSP management during current reentry processing Bit #3: Omit Network Address Acquisition management messages during current reentry processing Bit #4: Omit time of Day Acquisition management messages during current reentry processing Bit #5: Omit TFTP management messages |

TABLE 11-continued

| | during current reentry processing Bit #6: Full service and operational state transfer or sharing between Serving BS and Target BS (ARQ, timers, counters, MAC state machines, etc.) Bit #7: post-HO reentry MSS DL data processing at Target BS |
|---|---|
| HO ID | The identifier assigned to a MSS during HO by a target BS |
| Location Update | 0x00: Failure of Location Update, The MSS shall perform Network Reentry from Idle Mode. 0x01: Success of Location update 0x10, 0x11: Reserved |
| Paging Information | Paging information shall be only be included if Location Update Response = 0x01 and if Paging Information has changed. Bits 15:0 - PAGING CYCLE - Cycle in which the paging message is transmitted within the paging group Bits 23:16 - PAGING OFFSET - Determines the frame within the cycle in which the paging manage is transmitted. Must be smaller than PAGING CYCLE value Bits 31:24 - Paging Group ID - ID of the paging group the MSS is assigned to |
| Paging Controller ID | This is a logical network identifier for the serving BS or other network entity retaining MSS service and operational information and/or administrating paging activity for the MSS while in Idle Mode. Paging Controller ID shall only be included if Location Update Response = 0x01 and if Paging Controller ID has changed. |

The ranging response (RNG-RSP) TLV message is the information added to the ranging response when the mobile subscriber station re-registers to the network after having made the location update or after having terminated the idle mode. Though this, the base station notifies the mobile subscriber station of the valid information retained by the network so that the mobile subscriber station can know the procedures that can be omitted in performing the network re-registration.

Besides the above-explained method, the mobile subscriber station performs location update through ranging at a time point corresponding to an update condition. In doing so, the mobile subscriber station uses the messages shown in Table 7 and Table 8. The location update condition includes a case when a paging zone is changed, a case when a timer expires and the like.

If the forwarded paging message instructs not to do any activity, the mobile subscriber station maintains the idle mode without doing a specific activity. If the mobile subscriber station terminates the idle mode since an uplink or downlink traffic of the mobile subscriber station is generated or since the mobile subscriber station moves away into another base station belonging to a different paging group, the base station informs other base stations belonging to the same paging group of such a fact so that they can delete the corresponding mobile subscriber station from the idle mode mobile subscriber station list.

In the related art, the mobile subscriber station enables the base station or the paging controller to retain the information of the mobile subscriber station. In particular, an IP address of the mobile subscriber station is made to be retained. In case that the IP address needs to be updated due to the variation of an IP subnet or a foreign agent after transition to the idle mode, the mobile subscriber station detects this only by the periodic location update with the base station and then updates the IP address.

Hence, it is unable to immediately perform the IP address update according to the variation of the IP subnet of the mobile subscriber station, which retains the IP address and is in idle mode, or the foreign agent. Moreover, if data is forwarded while the IP address setting of the idle mode mobile subscriber station is not updated yet, the data is forwarded via an unnecessary path in the network. Hence, resources are wasted.

DISCLOSURE

Technical Problem

Technical Solution

Advantageous Effects

The present invention is applicable to a broadband wireless access system having at least two or more base stations belonging to a same paging group and belonging to different networks, respectively. The base station receives a message including information indicating that a specific mobile subscriber station is to enter an idle mode and an identifier indicating the network to which the mobile subscriber station belongs. The message including the information indicating that the specific mobile subscriber station is to enter the idle mode and the identifier indicating the network to which the mobile subscriber station belongs can be received via a paging announce (Paging-announce) message. Information of the network to which the mobile subscriber station belongs can be represented as a network identifier (Net ID) for example. The network identifier can indicate a subnet or a foreign agent.

A procedure of transmitting a message indicating an identifier of the mobile subscriber station and a fact that the mobile subscriber station should update an IP address and updating the IP address between the base station and the mobile subscriber station is performed. The message indicating the identifier of the mobile subscriber station and the fact that the mobile subscriber station should update the IP address can be transited via a paging advertisement message. The paging advertisement message can be periodically transmitted by the base stations within a same paging zone.

BEST MODE FOR CARRYING OUT THE INVENTION

The aforesaid objectives, features and advantages of the invention will be set forth in the description which follows, and in part will be apparent from the description. Reference will now be made in detail to one preferred embodiment of the present invention, examples of which are illustrated in the accompanying drawings.

Figure 1:
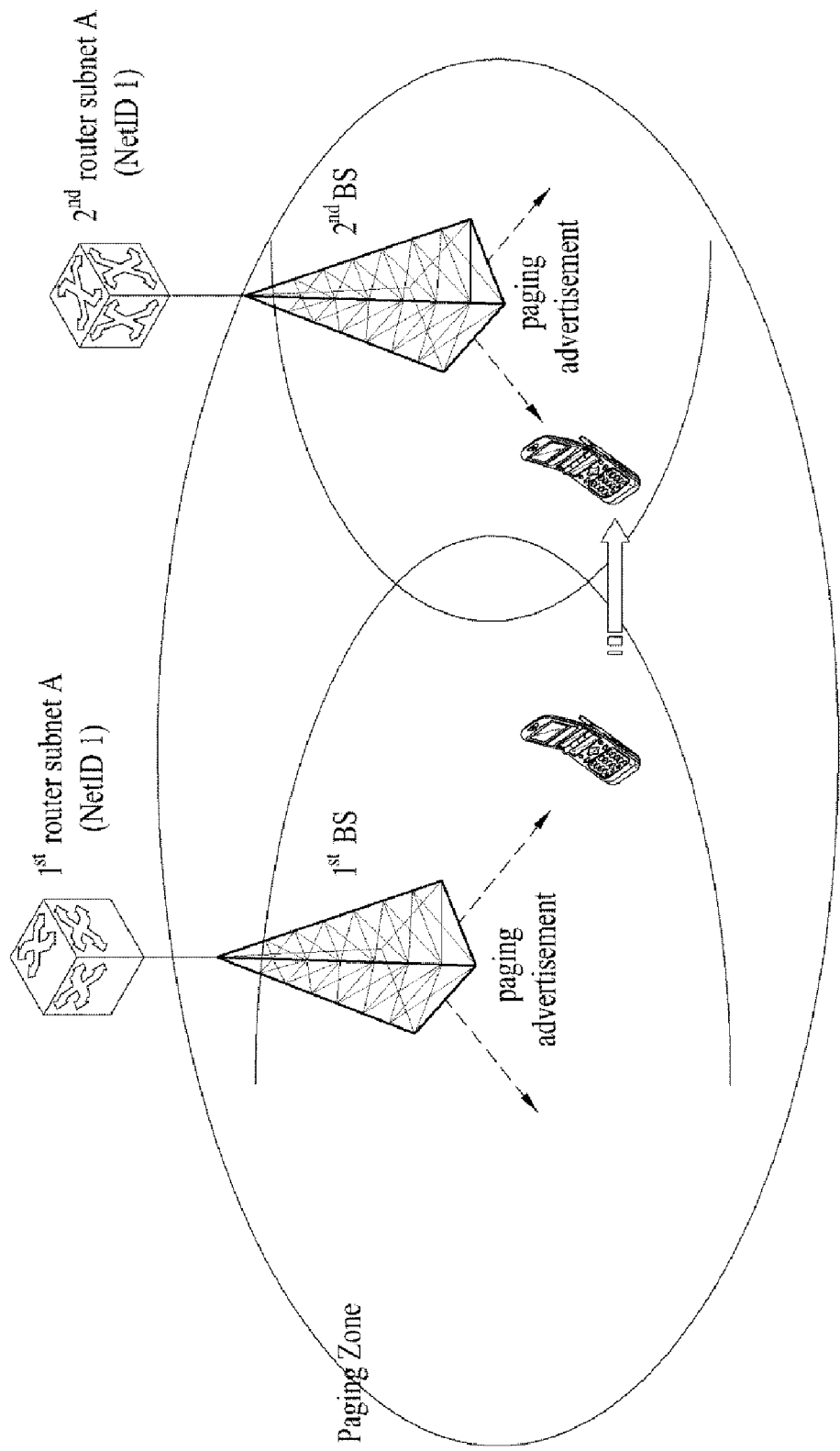
FIG. 1 is a diagram for explaining a paging zone to which the present invention is applied.

FIG. 1 is a diagram for explaining a paging zone to which the present invention is applied. Referring to FIG. 1, a mobile subscriber station in idle mode enters a second base station area from a first base station area within a same paging zone. The first and second base stations are connected to different subnets or foreign agents, respectively. FIG. 1 represents routers connected to the base stations are different from each other. Yet, the present invention is applicable to a case that the subnets are different or a case that the foreign agents are different.

In case that the subnets or foreign agents are different, if the mobile subscriber station does not perform a change of IP, the first base station should forward data to the second base station. Hence, in order for the mobile subscriber station to receive the data via an optimal path, the IP of the mobile subscriber station should be changed. In such a case, the subnets or the foreign agents can be identified using network IDs (Net ID) defined on a MAC level each.

Figure 2:
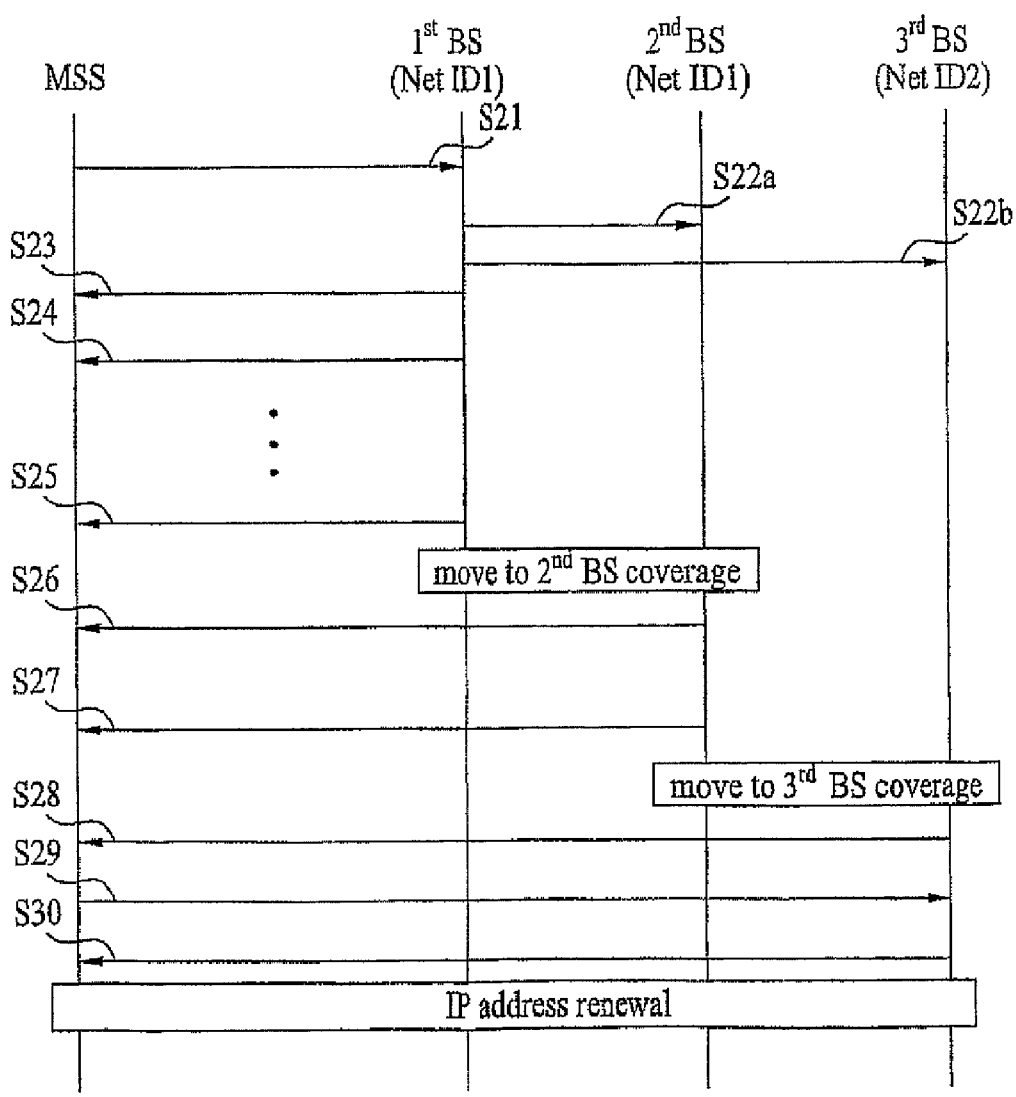
FIG. 2 is a flowchart of an IP reestablishment procedure of an idle mode mobile subscriber station according to one embodiment of the present invention.

FIG. 2 is a flowchart of an IP reestablishment Procedure of an idle mode mobile subscriber station according to one embodiment of the present invention. Referring to FIG. 2, to enter an idle mode, a mobile subscriber station transmits an idle mode request message including mobile subscriber station's session information (mobile subscriber station's capability, authentication information, IP address information, etc.) needing to be retained by a base station to the base station (S21). A first base station having received the idle mode request message transmits a paging announce (PAG-Announce) message to base station having a same paging group ID to add the corresponding mobile subscriber station to a current paging group. The paging announce message includes an action code and network identifier (Net ID) to be added to the paging group. And, the paging announce message can be transmitted via a backbone network.

The paging announce message is a message to inform all base stations with a paging group or a paging controller of information indicating that a mobile subscriber station has entered an idle mode. And, the paging announce message includes information of the subnet or foreign agent to which the base station of an area where the mobile subscriber station currently exists is connected. The information of the subnet or foreign agent to which the base station is connected can be transmitted in a form of the network identifier (Net ID). Hence, the network identifier (Net ID) can be replaced by another identifier or information that can identify the subnet or foreign agent.

Table 12 shows an example of a paging announce message. Referring to Table 12, a network identifier (Net ID) can be included in a paging announce message. The network identifier (Net ID) is an identifier to identify a subnet or foreign agent and can be represented as an IP address or the like.

TABLE 12

| Field | Size | Notes |
| --- | --- | --- |
| Message Type | 8 bits | |
| Sender BS-ID | 48 bits | Base station unique identifier (Same number as that broadcasted on the DL-MAP message) |
| Recipient BS-ID | 48 bits | Set to 0xffffff to indicate broadcast |
| Time Stamp | 32 bits | Number of milliseconds since midnight GMT (set to 0xffffffff to ignore) |
| Num MSS For(j=0; j<Num MSS; j++) [ | 8 bits | Number of MSSs to page |
| MSS MAC address | 48 bits | |
| Paging Group ID | 8 bits | The identifier of the paging group to which the MSS belongs |

TABLE 12-continued

| Field | Size | Notes |
|---|---|---|
| PAGING CYCLE | 16 bits | MSS PAGING CYCLE parameter |
| PAGING OFFSET | 8 bits | MSS PAGING OFFSET parameter |
| Action Code | 3 bits | 0: MSS enters Idle Mode |
| | | 1: MSS exists Idle Mode |
| | | 2: MSS should be paged to perform ranging to establish location and acknowledgement message |
| Net ID | 8 bits | MSS's subnet ID or Foreign Agent ID |
| reserved | 5 bits | |
| } | | |
| Security field | TBD | A means to authenticate this message |
| CRC field | 32 bits | IEEE CRC-32 |

The first base station can transmit the information of the mobile subscriber station having entered the idle mode to all base stations within a paging zone (22a, 22b). Meanwhile, in case that a paging controller is provided, the mobile subscriber station information is transmitted to the paging controller so that the paging controller can forward the information to all base stations within the same paging zone. Alternatively, the information is transmitted to the paging controller only and the base stations within the same paging zone are informed that the paging controller shall send a paging message later. In doing so, the network identifier (Net ID) to which the mobile subscriber station belonged is included to be forwarded.

In this case, the paging controller can be regarded as a network controller as well.

The entire base stations having received the information of the mobile subscriber station existing within the paging zone can recognize whether the mobile subscriber station should re-establish an IP address in a corresponding base station, using the received information.

The first base station transmits an idle mode response message including mobile subscriber station's session information to be retained to the mobile subscriber station (S23). Meanwhile, in case that the paging controller is provided, the paging controller can retain the session information. The idle mode response message includes paging information such as a paging cycle, a paging offset, a paging ID and the like.

The mobile subscriber station receives a paging advertisement (PAG-ADV) message transmitted in a broadcast format according to the paging cycle from the first base station (S24, S25). Meanwhile, the broadcast-formatted paging advertisement message is identically transmitted to another base stations within the paging zone. In doing so, each of the base stations can transmit information indicating whether to reestablish the IP address via the paging advertisement message.

The paging advertisement message (PAG-ADV) is a message the base station periodically forwards to the mobile subscriber station in idle mode. Via the paging advertisement message, a no action instruction or information indicating whether a location update of the mobile subscriber station is necessary can be transmitted. A network access can be requested to the mobile subscriber station using the paging advertisement message if there is a request made by the base station or if data to be forwarded to the mobile subscriber station is generated. In forwarding the paging advertisement message, each of the base stations within the paging group can transmit the information indicating whether to update the IP address since the mobile subscriber station moves away into another network different from the subnet or foreign agent supported by the current base station, using the mobile subscriber station information received from the paging controller or network.

Table 13 is an example of a paging advertisement message.

TABLE 13

| Syntax | Size | Notes |
|---|---|---|
| MOB_PAG-ADV_Message_Format( ) { | | |
| Management Message Type=?? | 8 bits | |
| Num_Paging_Group_IDs | 8 bits | Number of Paging Group IDs in this message |
| For(i=0; i<Num_Paging_Group_IDs; I++ { | | |
| Paging Group ID | 8 bits | |
| } | | |
| For(j=0; j<Num _MACs; j++) { | | Number of MSS MAC Addresses in message can be determined from the length of the message (found in the generic MAC header). |
| MSS MAC Address hash | 24 bits | The hash is obtained by computing a CRC24 on the MSS 48-bit MAC address. The polynomial for the calculation is 0x864CFB. |
| Action Code | 2 bits | Paging action instruction to MSS: 00 = No Action Required; 01 = Perform Ranging to establish location and acknowledge message; 10 = Enter Network; and 11 = Reserved |
| IP Address Re-establish | 1 bit | If this bit is set, MSS'IP address can not be supported in this BS and IP address re-establishment is required. |
| reserved | 5 bits | |
| } | | |
| TLV Encoded Information | variable | TLV specific |
| reserved | variable | Padding bits to ensure octet aligned |
| } | | |

The paging advertisement message is a message each of the base stations within the paging zone periodically forwards to the mobile subscriber station. The paging advertisement message is set to whether the mobile subscriber station should retain or update the IP address using the information received from the paging controller or network and is then transmitted. Meanwhile, the base station can transmit the information about whether to update the IP address via a different message periodically forwarded to the mobile subscriber station.

In case that mobile subscriber station moves away into an area of the second base station belonging to the same paging group, each of the base stations transmits the information indicating whether the mobile subscriber station should re-establish the IP address. Since the mobile subscriber station has moves away into the area of the second base station, the mobile subscriber station receives the information indicating whether the mobile subscriber station should re-establish the IP address from the second base station (S26, S27).

The mobile subscriber station receives a paging advertisement message from the second base station according to a paging cycle. Like the paging advertisement message transmitted from the first base station, the second base station transmits the paging advertisement message including the information indicating whether to re-establish the IP address to the mobile subscriber station in a broadcast format. The information known via the paging announce message broadcast when the mobile subscriber station enters the idle mode or the value informed by the paging controller is used. In the present embodiment, since the second base station is connected to the same subnet or foreign agent of the first base station, the IP re-establishment may not be required. Namely, it is assumed that the first base station at the time when the mobile subscriber station enters the idle mode and the second base station have the same network identifier (Net ID). Hence, in the area of the second base station, the mobile subscriber station receives the paging advertisement message including the information indicating that the re-establishment of the IP address is not required.

The mobile subscriber station moves away into an area of a third base station within the same paging group. The mobile subscriber station receives a paging advertisement message from the third base station according to a paging cycle (S28). Like the areas of the first and second base stations, the mobile subscriber station receives the paging advertisement message including the information indicating whether to re-establish the IP address from the third base station.

In the present embodiment, since the third base station is connected to a subnet or foreign agent different from that of the first or second base station, it is assumed that the IP of the mobile subscriber station needs to be changed. Namely, it is assumed that the third base station has a network identifier (Net ID) different from that of the first base station at the time point when the mobile subscriber station entered the idle mode.

Hence, the third base station transmits the information indicating that the mobile subscriber station needs to change the IP address via the paging advertisement message. The paging advertisement message transmitted from each of the first to third base stations in the broadcast format is not only the message, which is transmitted only if the corresponding mobile subscriber station moves away into the second or third base station, but also the message periodically broadcast from each of the base stations if a specific mobile subscriber station enters an idle mode.

The mobile subscriber station having received the information indicating that the IP address needs to be changed performs ranging for a location update (S29, S30) and re-establishes the IP address.

In the embodiment shown in FIG. 2, if the mobile subscriber station enters the idle mode, the entire base stations within the same paging zone transmit the paging advertisement messages by the same cycle to the mobile subscriber station having entered the idle mode. Hence, if the mobile subscriber station moves away into another base station area, the mobile subscriber station receives the paging advertisement message periodically transmitted from the corresponding base station.

Accordingly, in case that a mobile subscriber station in idle mode enters a new base station area, the present invention enables the mobile subscriber station to quickly update an IP address, thereby delivering data via a more efficient path and thereby reducing complexity of an activity of a base station that should forward data between base stations.

INDUSTRIAL APPLICABILITY

Accordingly, the present invention is applicable to a mobile communication system, and more particularly, to a broadband wireless access system.

The invention claimed is:

1. A method of transmitting information for reestablishing an Internet Protocol (IP) address of a mobile subscriber station in a broadband wireless access system, the method comprising:
   receiving, by a first base station, a first message including information indicating that the mobile subscriber station has entered an idle mode and information indicating a subnet or a foreign agent to which a second base station is connected; and
   transmitting, by the first base station, a second message to the mobile subscriber station in the idle mode, the second message including a field indicating whether the mobile subscriber station is required to reestablish the IP address, wherein the second base station has approved the entry of the mobile subscriber station in the idle mode,
   wherein the first base station and the second base station belong to a same paging group,
   wherein the field of the second message is set based on the information indicating the subnet or the foreign agent to which the second base station is connected, and
   wherein the mobile subscriber station performs ranging for a location update and reestablishes the IP address if the field of the second message indicates that the mobile subscriber station is required to reestablish the IP address.

2. The method of claim 1, wherein the first message is a paging announce (Paging-announce) message.

3. The method of claim 1, wherein the information indicating the subnet or the foreign agent to which the second base station is connected comprises a network identifier (Net ID) of the subnet or the foreign agent.

4. The method of claim 1, wherein the first message is received from a paging controller.

5. The method of claim 1, wherein the first message is received from the second base station.

6. The method of claim 1, wherein the second message is a paging advertisement message.

7. The method of claim 6, wherein the paging advertisement message is periodically transmitted.

8. The method of claim 1, wherein, if the first base station is connected to the subnet or the foreign agent to which the second base station is connected, the field is set to indicate that the mobile subscriber station is not required to reestablish the IP address.

9. The method of claim 1, wherein, if the first base station is connected to a subnet or a foreign agent different from the subnet or the foreign agent to which the second base station is connected, the field is set to indicate that the mobile subscriber station is required to reestablish the IP address.

10. A method of reestablishing an Internet Protocol (IP) address of a mobile subscriber station area station in a broadband wireless access system, the method comprising:
- transmitting, by the mobile subscriber station, an idle mode request message to a first base station, the idle mode request message requesting entry to an idle mode;
- receiving, by the mobile subscriber station, an idle mode response message from the first base station, the idle mode response message including paging information indicating a paging cycle and a paging offset;
- receiving, by the mobile subscriber station, a paging advertisement message from at least a second base station belonging to a same paging group as the first base station, the paging advertisement message including a field indicating whether the mobile subscriber station is required to reestablish the IP address, wherein the field is set based on information regarding a subnet or a foreign agent to which the at least a second base station is connected; and
- performing, by the mobile subscriber station, ranging for a location update and reestablishing the IP address if the field of the paging advertisement message indicates that the mobile subscriber station is required to reestablish the IP address.

11. The IP address updating method of claim 10, wherein the paging advertisement message is periodically received.

* * * * *